US008265347B2

(12) United States Patent
Zhang et al.

(10) Patent No.: US 8,265,347 B2
(45) Date of Patent: Sep. 11, 2012

(54) METHOD AND SYSTEM FOR PERSONAL IDENTIFICATION USING 3D PALMPRINT IMAGING

(75) Inventors: David Zhang, Hong Kong (HK); Guangming Lu, Hong Kong (HK); Nan Luo, Hong Kong (HK); Wei Li, Hong Kong (HK); Lei Zhang, Hong Kong (HK); Vivek Kanhangad, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 604 days.

(21) Appl. No.: 12/428,039

(22) Filed: Apr. 22, 2009

(65) Prior Publication Data

US 2009/0268951 A1 Oct. 29, 2009

Related U.S. Application Data

(60) Provisional application No. 61/047,437, filed on Apr. 24, 2008.

(51) Int. Cl.
*G06K 9/62* (2006.01)

(52) U.S. Cl. ........................................ 382/115; 382/125

(58) Field of Classification Search ........................ None
See application file for complete search history.

(56) References Cited

U.S. PATENT DOCUMENTS

| 3,576,537 | A | 4/1971 | Ernst |
| 3,576,538 | A | 4/1971 | Miller |
| 3,581,282 | A | 5/1971 | Altman |
| 4,032,889 | A | 6/1977 | Nassimbene |
| 4,736,203 | A | 4/1988 | Sidlauskas |
| 5,502,774 | A * | 3/1996 | Bellegarda et al. ........... 382/159 |
| 5,832,106 | A * | 11/1998 | Kim .............................. 382/154 |
| 6,370,263 | B1 * | 4/2002 | Hiratsuka et al. ............. 382/115 |
| 7,092,556 | B2 * | 8/2006 | Tokorotani ..................... 382/126 |
| 7,466,846 | B2 | 12/2008 | David et al. |
| 7,983,451 | B2 * | 7/2011 | Super et al. .................... 382/115 |
| 2006/0120576 | A1 * | 6/2006 | Chen .............................. 382/124 |
| 2007/0165243 | A1 * | 7/2007 | Kang et al. ..................... 356/603 |

OTHER PUBLICATIONS

B. Girod, G. Günther, and G. Heinrich, *Principles of 3D Image analysis and Synthesis*, Springer, 2000.
W. K. Kong and D. Zhang, "Competitive coding scheme for palmprint verification", *Proc. 17th ICPR*, Washington, DC, vol. 1, pp. 1051-4651, 2005.
O'Neill, *Elementary Differential Geometry*. New York: Academic, 1966.
V. Kanhangad, D. Zhang, and L. Nan, "A multimodal biometric authentication system based on 2D and 3D palmprint features," *Proc. SPIE* vol. 6944, Biometric Technology for Human Identification, Orlando, Florida, pp. 69440C-69440C, Mar. 2008.
D. Zhang, W. K. Kong, J. You, and M. Wong, "Online palmprint identification", *IEEE Trans. Pattern Anal. Mach. Intell.*, vol. 25, No. 9, pp. 1041-1050, Sep. 2003.
S. Malassiotis, N. Aifanti, and M. G. Strintzis, "Personal authentication using 3D finger geometry," *IEEE Trans. Inf. Forensics Security*, vol. 1, pp. 12-21, Mar. 2006.

* cited by examiner

*Primary Examiner* — Brian P Werner
(74) *Attorney, Agent, or Firm* — Muncy, Geissler, Olds & Lowe, PLLC

(57) ABSTRACT

A biometric identification system (30) for identifying a person, the system (30) comprising: an image acquisition module (31) to capture a three-dimensional (3D) image of a palm of the person; a region of interest (ROI) extraction module (34) to extract a 3D subimage from the captured image; and a 3D features extraction module (36) to extract 3D palmprint features from the 3D subimage; wherein the extracted 3D palmprint features are compared to reference 3D palmprint features to verify the identity of the person.

9 Claims, 8 Drawing Sheets

METHOD AND SYSTEM FOR PERSONAL IDENTIFICATION USING 3D PALMPRINT IMAGING

CROSS-REFERENCE TO RELATED APPLICATIONS

The present application claims the benefit of U.S. Provisional Patent Application No. 61/047,437, filed Apr. 24, 2008.

TECHNICAL FIELD

The invention concerns a method and system for personal identification using 3D palmprint imaging.

BACKGROUND OF THE INVENTION

Reliability for personal authentication is important for security in a networked society. Many physiological characteristics of humans such as biometrics, are typically time invariant, easy to acquire, and unique for every individual. Biometric features such as face, iris, fingerprint, hand geometry, palmprint, and signature have been suggested for security to control access.

The reliability of personal identification using the face is currently low as there are problems relating to pose, lighting, orientation and gesture. Fingerprint identification is widely used for personal identification because it works well in most cases. For some cases, however, it is difficult to acquire fingerprint features such as minutiae for people including manual laborers and elderly people. As a result, other biometric characteristics are receiving increased attention. However, typical 2D palmprint systems are more prone to spoof attacks compared to fingerprint systems that require special materials and sometimes special skills.

SUMMARY OF THE INVENTION

In a first preferred aspect, there is provided a biometric identification system for identifying a person, the system comprising:
  an image acquisition module to capture a three-dimensional (3D) image of a palm of the person;
  a region of interest (ROI) extraction module to extract a 3D subimage from the captured image; and
  a 3D features extraction module to extract 3D palmprint features from the 3D subimage;
  wherein the extracted 3D palmprint features are compared to reference 3D palmprint features to verify the identity of the person.

The ROI extraction module may extract a two-dimensional (2D) subimage from the captured image, and further comprises:
  a 2D features extraction module to extract 2D palmprint features from the 2D subimage and to generate competitive code maps using the extracted 2D palmprint features;
  wherein angular distances between the competitive code maps and reference competitive code maps are calculated in order to identify the person.

The 3D palmprint features may include surface curvature of major palm lines

The system may further comprise an infrared sensor to detect the presence of a palm to initiate image capture of the palm of the person.

The system may further comprise a liquid crystal display (LCD) projector to generate arbitrary stripe patterns onto the surface of the palm to enable acquisition of depth information using active triangulation.

The image acquisition module may be a charge coupled device (CCD) camera.

A matching score may be calculated based on the comparison and the matching score is compared to a decision threshold, and if the matching score is greater than the decision threshold of a first decision module, the person is rejected as a fake palm or an impostor, and the identification process is terminated prior to the 2D Gabor feature extraction module extracting 2D palmprint features from the 2D subimage.

The ROI may be a coordinate system which uses the gaps between the fingers as reference points, and the 3D subimage is a fixed size located at a central part of the palm.

The 3D features extraction module may generate a curvature map using the extracted 3D palmprint features, and the curvature map is compared to a reference curvature map to determine whether a high correlation exists between the curvature maps in order to verify the identity of the person The 3D features extraction module may use a normalized local correlation method is used to compare the curvature map to the reference curvature map, using the expression:

$$C = \frac{\sum_{i=-N}^{N} \sum_{j=-N}^{N} (P_{ij} - \overline{P})(Q_{ij} - \overline{Q})}{\sqrt{\left[\sum_{i=-N}^{N} \sum_{j=-N}^{N} (P_{ij} - \overline{P})^2\right]\left[\sum_{i=-N}^{N} \sum_{j=-N}^{N} (Q_{ij} - \overline{Q})^2\right]}}$$

where $P_{ij}$ and $Q_{ij}$ are curvature values in the neighborhood of the points being matched in the curvature map and reference curvature map, respectively, and $\overline{P}$ and $\overline{Q}$ are the mean curvature values in those neighborhoods.

In a second aspect, there is provided a method for identifying a person using their palm, the method comprising:
  capturing a three-dimensional (3D) image of the palm of the person;
  extracting a 3D subimage from the captured image; and
  extracting 3D palmprint features from the 3D subimage;
  wherein the extracted 3D palmprint features are compared to reference 3D palmprint features to verify the identity of the person.

The method may further comprise:
  extracting a two-dimensional (2D) subimage from the captured image
  extracting 2D palmprint features from the 2D subimage;
  wherein the extracted 2D palmprint features are compared to reference 2D palmprint features to also verify the identity of the person.

A 3D matching score may be calculated from the extracted 3D palmprint features, and if the 3D matching score is above a first decision threshold value, the person is not identified as genuine.

A 2D matching score may be calculated from the extracted 2D palmprint features, and the 3D matching score is combined with the 2D matching score to generate a final matching score and if the final matching score is above a second decision threshold value, the person is not identified as genuine.

The extracted 3D palmprint features may be obtained using any one from the group consisting of: mean curvature, Gaussian curvature, surface type and any combination thereof.

The combination of the 2D matching score and 3D matching score is a weighted sum.

In a third aspect, there is provided an image acquisition device for identifying a person using their palm comprising:
- a light emitting device to project stripe patterns onto the surface of the palm for obtaining depth information using active triangulation;
- an image capture device to captures a three-dimensional (3D) image of the palm;
- an image processing module to process the captured image by:
  - extracting a 3D subimage from the captured image;
  - extracting 3D palmprint features from the 3D subimage; and
  - comparing the extracted 3D palmprint features to reference 3D palmprint features to verify the identity of the person.

The light emitting device may be a computer controlled liquid crystal display (LCD) projector The stripe patterns may be encoded with different levels of brightness The image capture device may be a charge coupled device (CCD) camera The device may further comprise an infrared sensor to detect the presence of a hand to commence image capture of the palm.

BRIEF DESCRIPTION OF THE DRAWINGS

An example of the invention will now be described with reference to the accompanying drawings, in which.

DETAILED DESCRIPTION OF THE DRAWINGS

Figure 1:
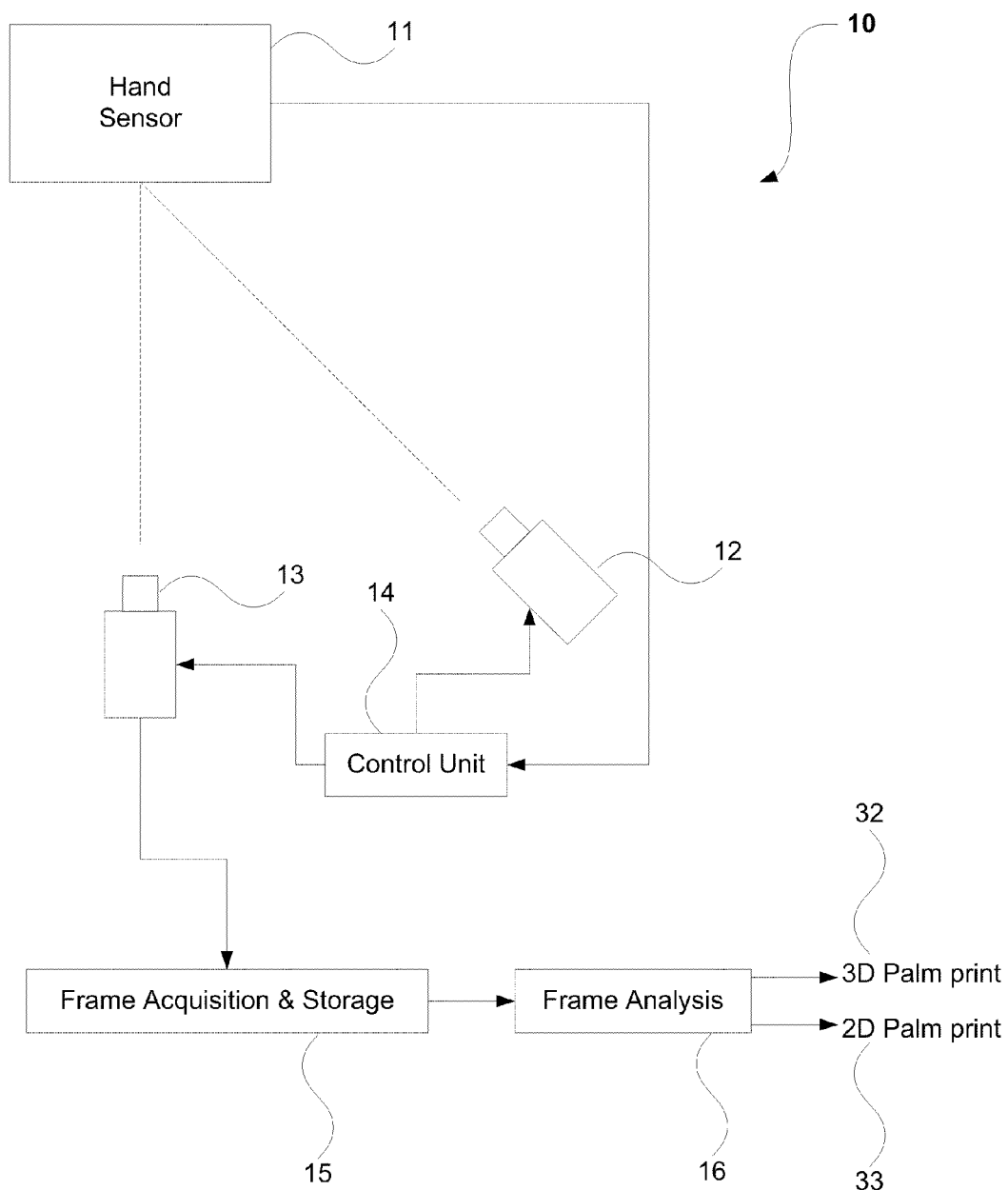
FIG. 1 is a block diagram of an image acquisition module according to a preferred embodiment of the present invention.
Figure 2:
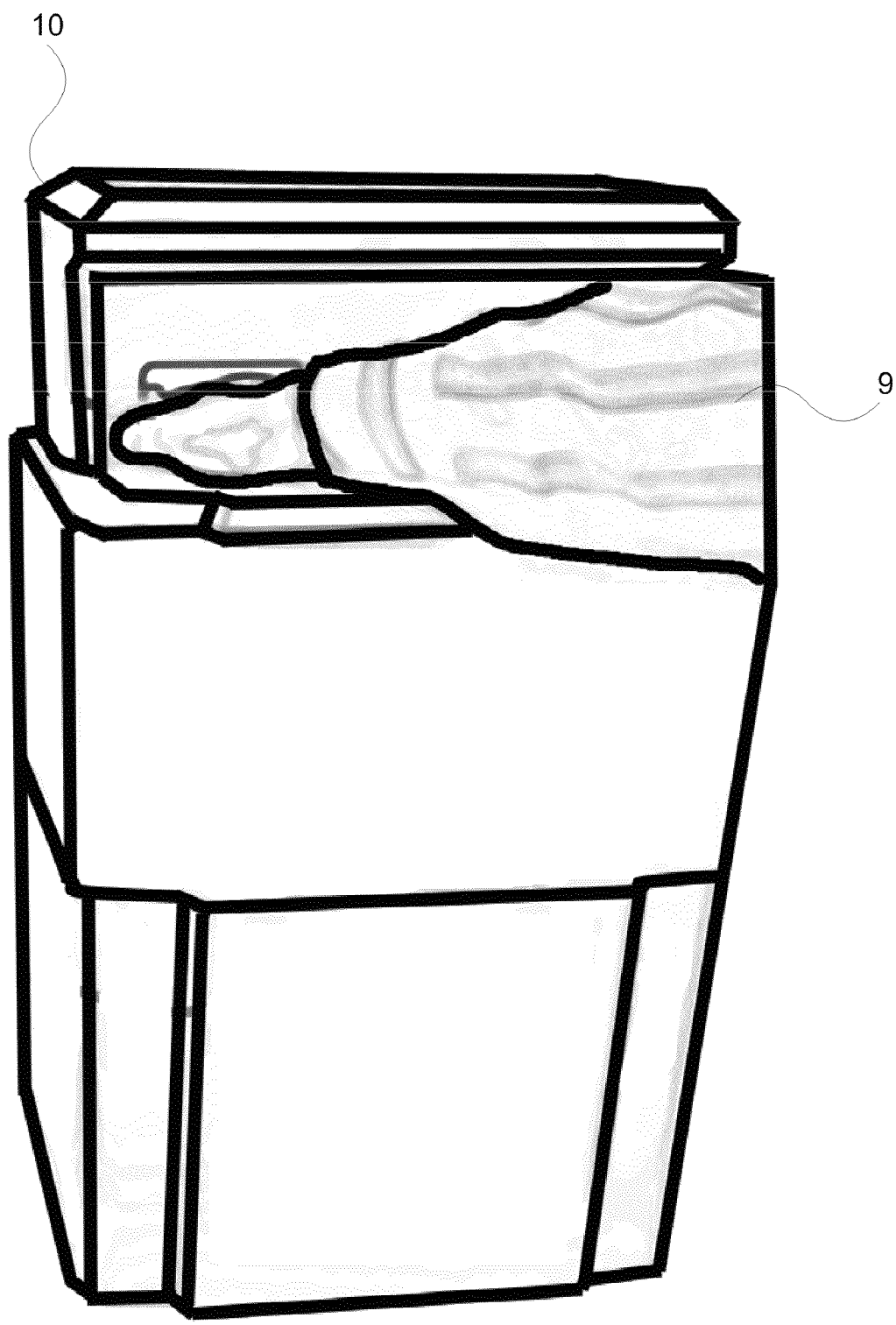
FIG. 2 is a photo of the 3D palmprint acquisition device corresponding to the image acquisition module of FIG. 1.

Referring to FIGS. 1 and 2, a system for reliable personal identification is provided that uses the 3D palmprint features. The unique 3D features of a palmprint are used in the system for identification purposes. Unique 3D features include surface curvature of major palm lines. In another embodiment, the system also combines 2D and 3D palmprint representations together for identification purposes. 3D and 2D information are extracted by the system in a fully automated manner and extraction of these palmprint features occur at the same time. A user does not have to undergo the inconvenience of passing through multiple sensors in contrast to face and fingerprint or voice and face multibiometric systems. This enables achieves high performance and security for personal identification. Also, using the palmprint has a high user-acceptance.

3D features of the palm are used in the system. In another embodiment, a combination of 2D and 3D features of the palm are used. The use of 3D features enables depth information from the surface of the palm for identification purposes. This makes the system extremely difficult to circumvent using spoof attacks. Spoof attacks include presenting a fake biometric to the acquisition device. The system is more robust to noise if there is some text or lines drawn on the palmprint. This is because the 3D depth features that are extracted from such palms are unaffected by noise and therefore results in a more robust system compared to existing 2D image based palmprint authentication systems.

A 3D palmprint image acquisition device 10 based on the principle of structured light is provided. Infrared sensors 11 are used to detect the presence of a hand 9 placed on the image acquisition device 10. When a hand 9 is detected by the infrared sensors 11, a control unit 14 sends a command to a liquid crystal display (LCD) projector 12 instructing it to project arbitrary stripe patterns onto the surface of the palm. This enables depth information using active triangulation to be acquired. In order to distinguish between stripes, the stripes are coded with different levels of brightness. At the same time, the control unit 14 sends a command to a charge coupled device (CCD) camera 13 to capture images of the palm. The sequence of images captured by the CCD camera 13 is then stored by a computer 15. After some frame analysis 16 is performed, 3D palm data is generated. The device 10 captures 3D palm data in point cloud form. It also captures a corresponding intensity image which is used for 2D palmprint feature extraction and matching.

Figure 3:
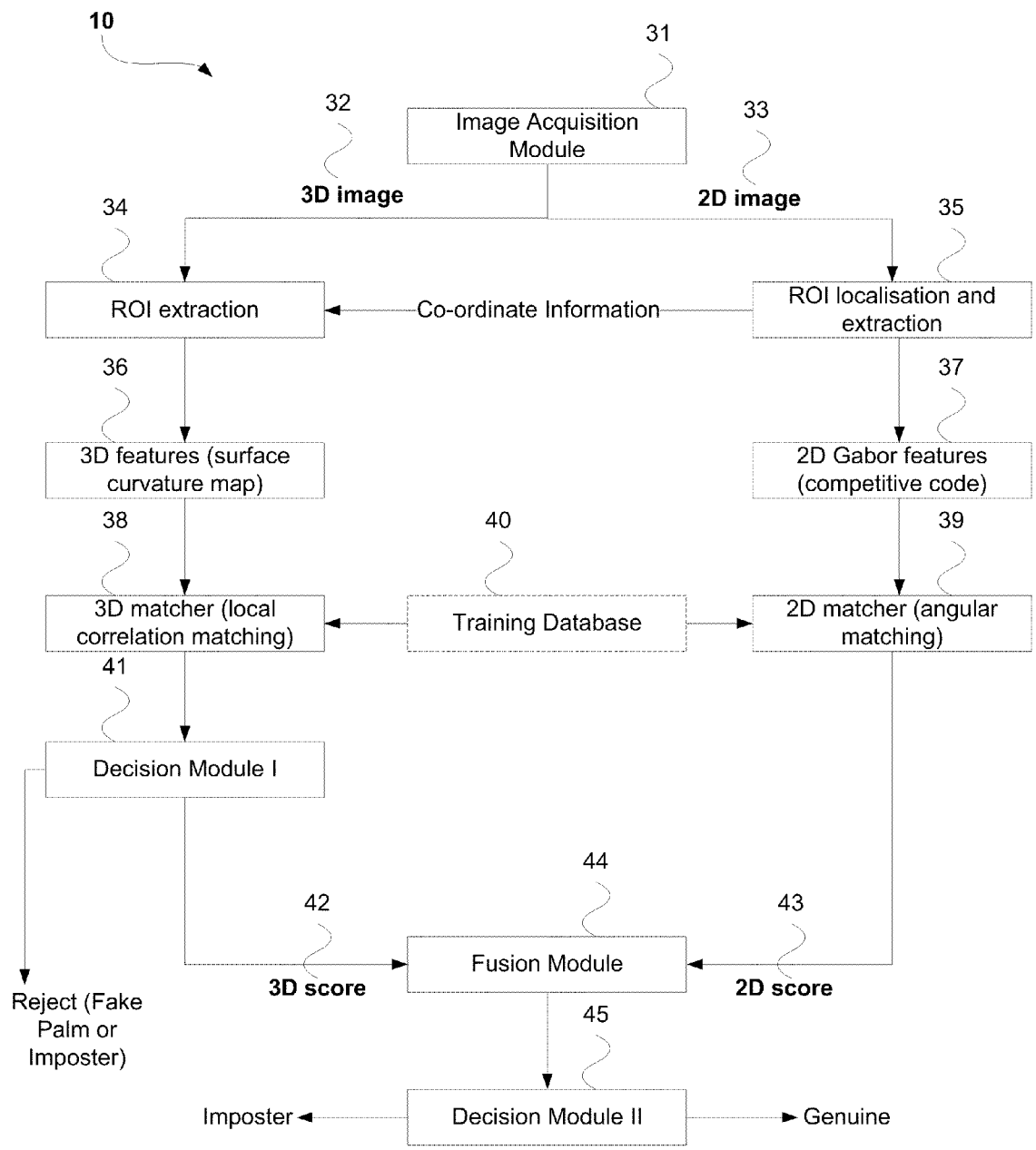
FIG. 3 is a block diagram of a palmprint identification system according to a preferred embodiment of the present invention.

Referring to FIG. 3, a multilevel framework 30 is provided for personal authentication that efficiently combines 2D and 3D palmprint features. Captured images 32, 33 of the palm are obtained by an image acquisition module 31. The image acquisition device 10 corresponds to the image acquisition module 31. An image processing module processes the captured images 32, 33. Each of the acquired 2D images 35 is automatically processed to extract a reliable region of interest (ROI) by an ROI extraction module 35. This approach establishes a coordinate system which uses the gaps between the fingers as reference points. A 2D subimage 48 of a fixed size located at the central part of the palmprint is extracted. Since the 2D palmprint pixels correspond one-to-one with the 3D palmprint points, the pixel coordinates of the 2D subimage 48 are conveniently used to locate the ROI and assist with extracting the 3D subimage 47 by another ROI extraction module 34.

A 3D features extraction module 36 extracts 3D palmprint features from the 3D subimage 47 to generate surface curvature maps. The 3D palmprint images 32 are first acquired by the image acquisition module 31. The 3D palmprint images 32 are rich in local structural features. The features which uniquely characterize the local shape of the surface of the palm are used as 3D representations in the form of surface curvature maps, for example. Properties such as mean and Gaussian curvatures are used to classify points on a surface to different classes. For a surface curvature map represented by X(u,v)=(u,v, f(u,v)), Gaussian curvature (K) and mean curvature (H) are calculated as follows:

$$K(X) = \frac{f_{uu}f_{vv} - f_{uv}^2}{(1+f_u^2+f_v^2)^2} \text{ and}$$

$$H(X) = \frac{(1+f_u^2)f_{vv} + (1+f_v^2)f_{uu} - 2f_uf_vf_{uv}}{(1+f_u^2+f_v^2)^{3/2}}$$

where, $f_u$, $f_v$ and $f_{uu}$, $f_{vv}$, $f_{uv}$ are first and second order partial derivatives of f(u,v). Once the values of K and H are found at every point on the 3D surface, the principal curvatures $k_1$ and $k_2$ are determined by:

$$k_1k_2 = H \pm \sqrt{H^2 - K}$$

The principal curvature values at every pixel are computed by fitting a quadratic surface over a local neighborhood and then estimating first and second derivatives of the surface. The partial derivatives are estimated using derivative operators. This approach uses a local least squares surface fit using orthogonal polynomial basis functions. Since this process involves the estimation of second derivates, the estimated curvature values are sensitive to noise in the input 3D data. This noise problem has been overcome by increasing the size of the local neighborhood used for fitting the surface.

The representation of the curvature of every point on the 3D palmprint surface by a scalar value, is achieved by computing the curvedness (C) using the equation:

$$C = \sqrt{(k_1^2 + k_2^2)/2}$$

The positive value C is a measure of how sharply or gently curved a point is. It is defined in terms of principal curvatures $k_1$ and $k_2$.

A scalar value of curvature is obtained for every point on the 3D palmprint image and stored in a 2D matrix. The surface curvature maps closely represent the depth information in the unique principal lines. This information cannot be obtained from the 2D imaging used in prior art palmprint devices.

A 2D Gabor feature extraction module 37 extracts 2D palmprint features from the 2D subimage 48. The extracted 2D palmprint features are used to generate competitive code maps which denote the orientation of the texture in the palmprint images 33. The orientation can be estimated by the following Gabor function:

$$\psi(x, y, \omega, \theta) = \frac{\omega}{\sqrt{2\pi}\kappa} e^{-\frac{\omega^2}{8\kappa^2}(4x'^2 + y'^2)} \left( e^{i\omega x'} - e^{-\frac{\kappa^2}{2}} \right)$$

where $$x' = (x-x_0)\cos\theta + (y-y_0)\sin\theta, \; y' = -(x-x_0)\sin\theta + (y-y_0)\cos\theta$$

$(x_0, y_0)$ is the center of the function; $\omega$ is the radial frequency in radians per unit length and $\theta$ is the orientation of the Gabor function in radians; $\kappa$ is a coefficient defined by $$\kappa = \sqrt{2\ln 2}\left(\frac{2^\delta + 1}{2^\delta - 1}\right)$$

where $\delta$ is the half-amplitude bandwidth of the frequency response.

A multilevel matcher is provided that uses a combination of 2D and 3D palmprint information to achieve significant improvement in performance compared to when either 2D or 3D information is solely used. The multilevel matcher has a 3D matcher 38 for local correlation matching and a 2D matcher for angular matching 39.

The 3D matcher 38 matches the surface curvature maps with reference surface curvature maps stored in the database 40. The inputs for the 3D matcher 38 are the sets of surface curvature maps 50 generated by the 3D features extraction module 36. The feature matching process establishes a similarity between the two matched samples. A normalized local correlation method 51 is used for comparing two curvature maps 50, for example. The result of this matching is a correlation value for every point in the input curvature maps which forms a correlation map 52. An average of these correlation values is used as the 3D score 42. The expression for normalized local correlation 51 is given by:

$$C = \frac{\sum_{i=-N}^{N}\sum_{j=-N}^{N}(P_{ij} - \overline{P})(Q_{ij} - \overline{Q})}{\sqrt{\left[\sum_{i=-N}^{N}\sum_{j=-N}^{N}(P_{ij} - \overline{P})^2\right]\left[\sum_{i=-N}^{N}\sum_{j=-N}^{N}(Q_{ij} - \overline{Q})^2\right]}}$$

where $P_{ij}$ and $Q_{ij}$ are curvature values in the neighborhood of the points being matched in the curvature maps of the two samples, respectively. $\overline{P}$ and $\overline{Q}$ are the mean curvature values in those neighborhoods. (2N+1)×(2N+1) is the size of the neighborhood in pixels. The value of C lies in the range of [−1, 1] with values 1 and −1 indicating a perfect match and mismatch, respectively.

Similarity between the two curvature maps 50 are then calculated using the local correlation method 51. If the 3D score 42 is greater than the decision threshold of a Decision Module I 41, the query is rejected as a fake palm or an impostor and the process is terminated. This is the first level of the multilevel authentication approach.

Figure 5:
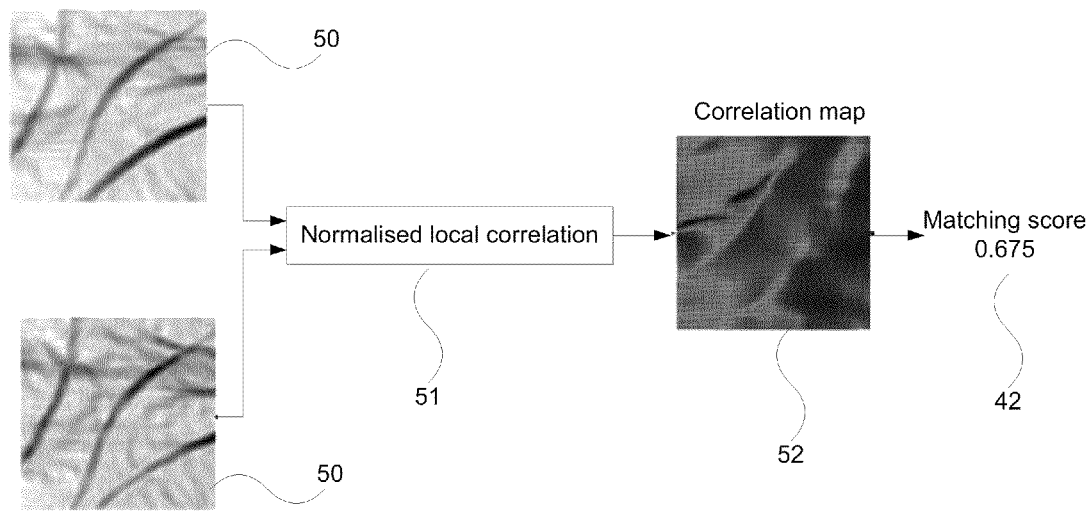
FIG. 5 is a process flow diagram illustrating matching of two curvature maps from the same subject.
Figure 6:
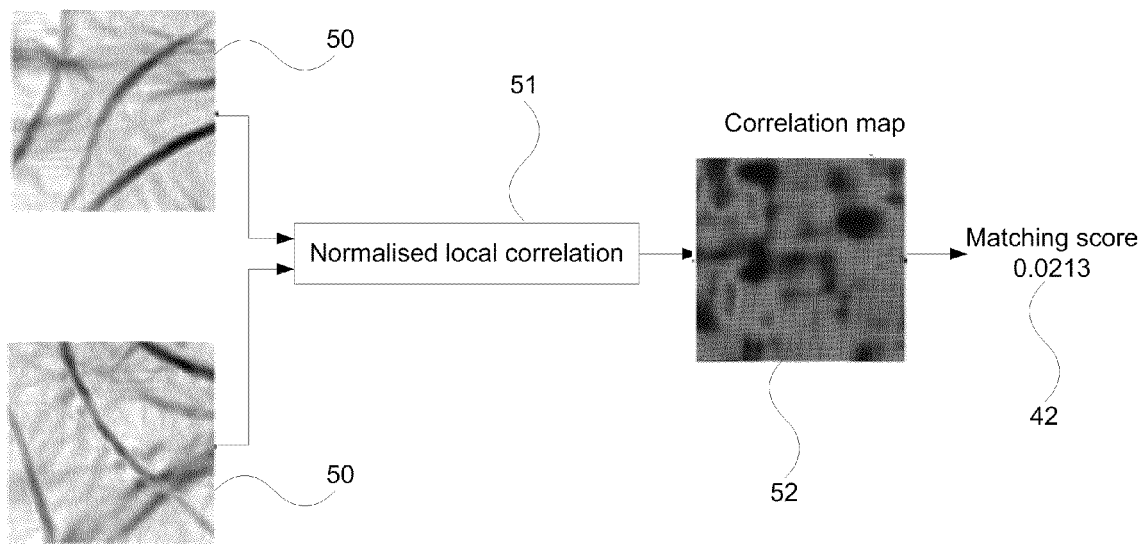
FIG. 6 is a process flow diagram illustrating matching of two curvature maps from different subjects.

Turning to FIGS. 5 and 6, the process of matching of two typical curvature maps 50 for the same user by the 3D matcher 38 is illustrated. The dark colored pixels in the correlation map 52 represent high values of correlation. The light colored pixels in the correlation map 52 represent low correlation. The 3D score 42 is the average of pixel values in the correlation map 52. FIG. 5 shows that genuine matching occurs in a correlation map 52 with large regions of dark colored pixels which indicates high correlation between the two curvature maps 50 that are being matched. In contrast, FIG. 6 illustrates different users and shows that no genuine matching occurs in a correlation map 52 with large regions of light colored pixels.

The 2D matcher 39 matches 2D features using angular distances for comparing the competitive code maps with reference competitive code maps stored in the database 40. Let P and Q be the two feature matrices (competitive code maps) and $P_M$ and $Q_M$ be the corresponding masks used for indicating the non palmprint pixels. Angular distance D(P,Q) is defined by the following equation:

$$D(P, Q) = \frac{\sum_{y=0}^{N}\sum_{x=0}^{N}\sum_{i=0}^{3}(P_M(x, y) \cap Q_M(x, y) \cap P_i^b(x, y) \otimes Q_i^b(x, y))}{\sum_{i=0}^{3} P_M(x, y) \cap Q_M(x, y)}$$

where ∩ and ⓧ denote the bitwise AND and XOR operations respectively. $P_i^b(Q_i^b)$ is the $i^{th}$ bit plane of P(Q). Taking into account the possible translations in the extracted 2D subimage 48 with respect to the one extracted during the enrollment, multiple matchings are performed with one of the features translated in horizontal and vertical directions. The minimum of the resulting matching scores is considered to be the final score.

If the 3D score 42 computed at the Decision Module I 41 is below the decision threshold, matching proceeds to a Decision Module II 45. The 2D score 43 from the 2D palmprint features are combined with the 3D matching score 42 from the Decision Module I 41 by a fusion module 44 to obtain a final matching score:

$$S_{2D+3D} = w_1 S_{2D} + w_2 S_{3D}$$

where $S_{2D}$ and $S_{3D}$ are the 2D and 3D matching score normalized to (0,100) range, $w_1$ and $w_2$ are two weights decided empirically. The final matching score is used by the Decision Module II 45 and compared with another decision threshold to determine and indicate whether the person is a genuine user or impostor.

Figure 4:
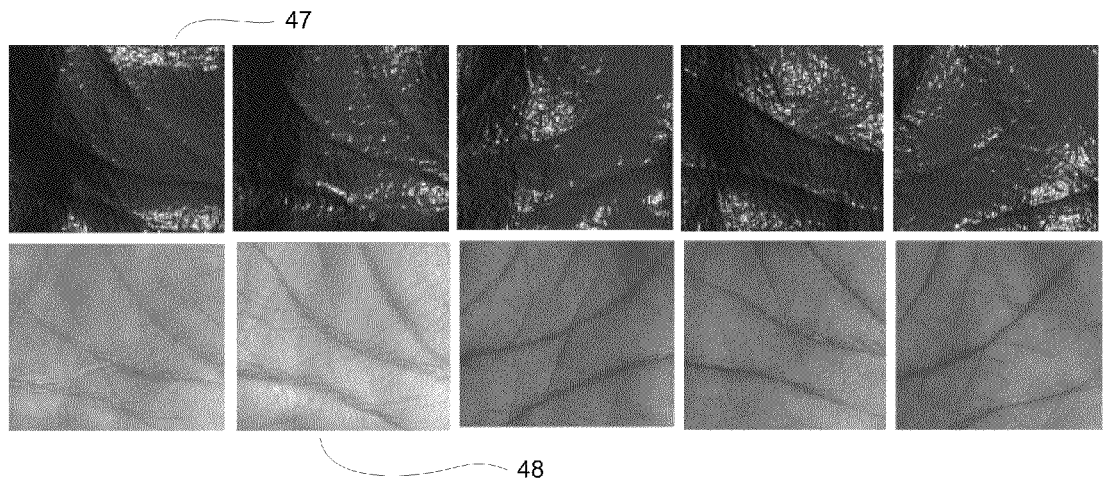
FIG. 4 are samples of 3D and 2D palmprints stored in a training database of the system of FIG. 3.

FIG. 4 is a sample of 3D subimages 47 and corresponding 2D subimages 48 acquired by the device 10. The subimages 47, 48 are stored in the database 40 as a reference. As described earlier, the subimages 47, 48 are processsed by the 3D features extraction module 36 to extract 3D palmprint features and the 2D Gabor feature extraction module 37 to extract 2D palmprint features, respectively.

Experiments and Testing

Rigorous experiments were initially performed on the specially acquired 3D palmprint image training database 40 of the 108 subjects to evaluate the system. The robustness of the system is investigated by analyzing 2D and 3D palmprint features. Another objective is to ascertain the performance improvement by combining 2D and 3D palmprint features that are simultaneously acquired by the image acquisition device 10. The database 40 for the experimental results reported includes only real palmprint images. All images were acquired using the capture device shown in FIG. 2. For each subject, six samples of 2D and 3D palmprint images were captured and stored in the database 40. Thus, there are a total of 648 palmprint images in the database 40. To obtain the verification accuracy, each palmprint image is matched with all other palmprint images in the database 40, resulting in 1,620 genuine and 208,008 impostors matching scores for each of the two modalities.

Figure 7:
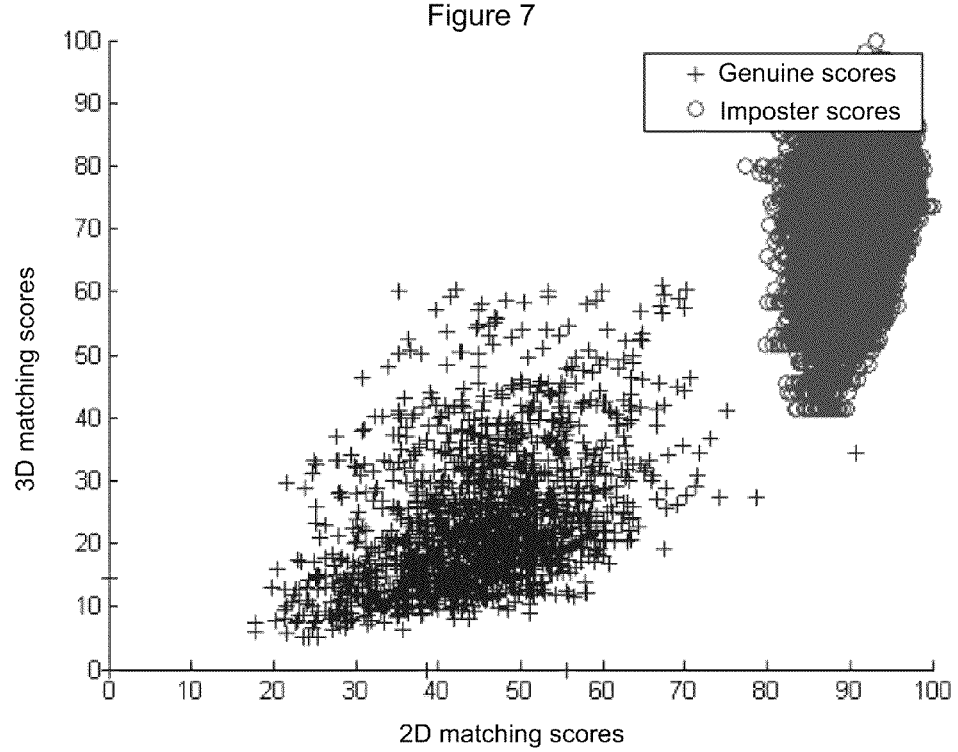
FIG. 7 is a chart illustrating genuine and impostor scores in 2 dimensional space.

FIG. 7 shows a scatter plot of the genuine and impostor score distributions obtained from 2D and 3D palmprint features. The genuine scores are located at the bottom left of the plot and the imposter scores are located in the top right of the plot. The two distributions are clearly separated and a linear classifier is able to discriminate the genuine and impostor score classes.

Figure 8A:
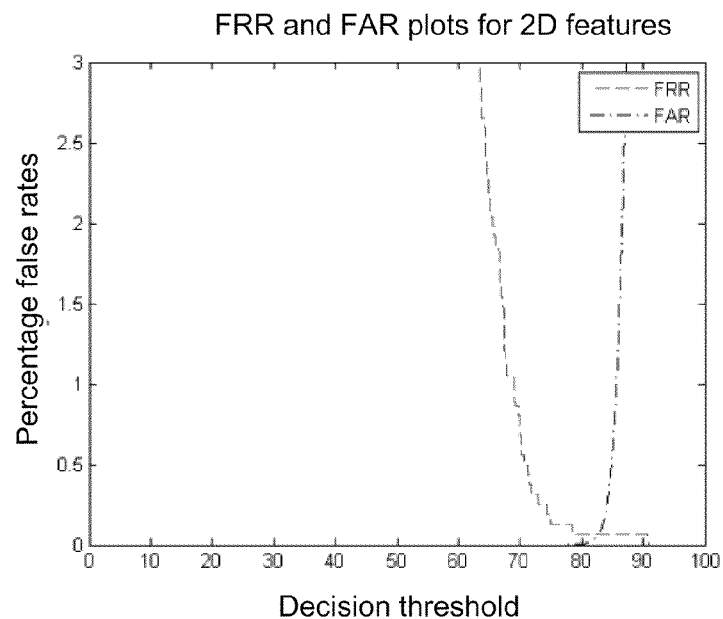
FIG. 8(a) is a chart illustrating FAR and FRR plots for 2D features.
Figure 8B:
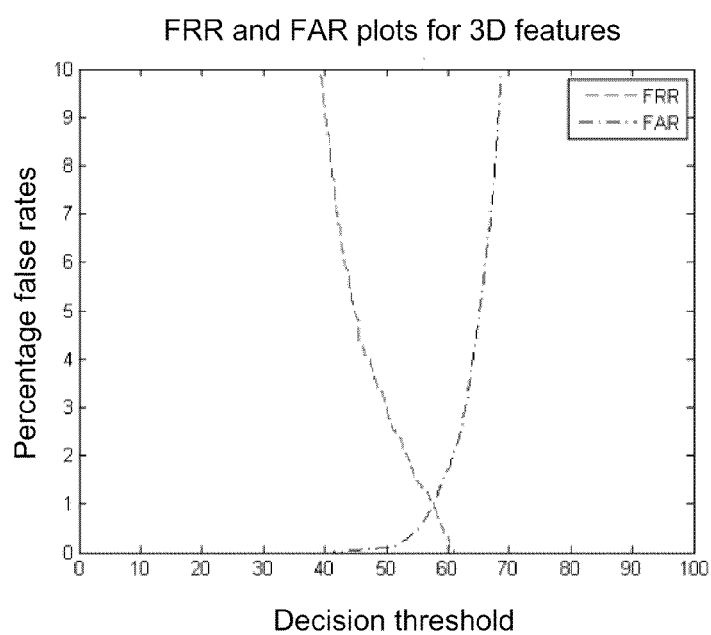
FIG. 8(b) is a chart illustrating FAR and FRR plots for 3D features.

FIGS. 8(a) and 8(b) show the performance obtained from 2D and 3D palmprint features, respectively, in terms of False Acceptance Rate (FAR) and False Rejection Rate (FRR) characteristics. The Equal Error Rate (EER) achieved from the two separate experiments using 2D and 3D features is illustrated in Table 1. The 2D palmprint representations depicted in FIG. 8(a) clearly outperform the 3D palmprint representations depicted in FIG. 8(b) in terms of accuracy.

TABLE 1

Performance indices from 2D, 3D and the (2D + 3D) palmprint representations

| Palmprint Matcher | EER (%) | Decidability Index (d') |
|---|---|---|
| 2D | 0.0621 | 6.50 |
| 3D | 0.9914 | 5.97 |
| Multi level (2D + 3D) | 0.0022 | 7.45 |

Figure 9:
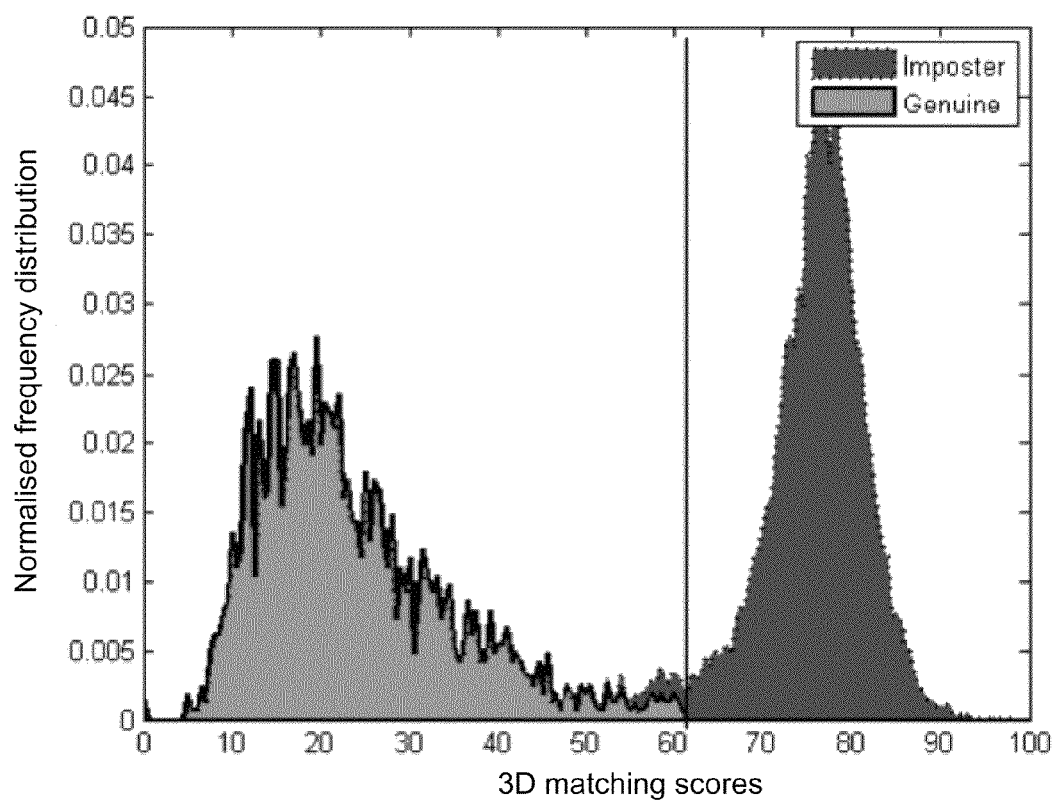
FIG. 9 is a chart illustrating a selection of decision thresholds for Decision Module I of FIG. 3.

Experiments were carried out to ascertain the possible performance improvement by combining two (2D+3D) palmprint representations using the the multilevel matching framework. The decision threshold of the Decision Module I was selected such that no genuine users are rejected at the first level of the multilevel authentication approach. This is achieved by setting the decision threshold to the operating point at which FRR for 3D palmprint features becomes zero. The value of this decision threshold was found to be 61.03 as illustrated in FIG. 9. All 3D matching scores (genuine and impostor) above this decision threshold are rejected at the first level of the multilevel authentication approach. After rejection at the first level of the multilevel authentication approach, there were 1620 genuine and 203,667 impostor scores for each of the two modalities. These scores were carried over to the second level of the multilevel authentication approach. At the second level of the multilevel authentication approach, a weighted sum rule is used to combine the 2D and 3D matching scores since the genuine and impostor distributions are originally well separated as illustrated in FIG. 7. The combined matching score (also referred to as a final matching score) is expressed as:

$$S_{2D+3D} = w_1 S_{2D} + w_2 S_{3D}$$

where $S_{2D}$ is the 2D matching score normalized to (0,100) range. To obtain the combined matching score, the 3D matching score, which is a dissimilarity score, is normalized to (0,100) range. After normalization, it is converted to a similarity score to obtain $S_{3D}$. The weights $w_1$ and $w_2$ are tuned to provide the best verification results. The optimal values of $w_1$ and $w_2$ are empirically calculated and found to be 0.56 and 0.44 respectively.

The experimental results from the system are summarized in Table 1 above. The decidability index (d') is used as a measure to quantify the improvement in the separability of impostor and genuine matching score distributions. It is computed as:

$$d' = \frac{|\mu_1 - \mu_2|}{\sqrt{\frac{\sigma_1^2 + \sigma_2^2}{2}}}$$

where $\mu_1$ and $\mu_2$ are the mean values and $\sigma_1^2$ and $\sigma_2^2$ are the variances of the genuine and impostor score distributions respectively.

Figure 10:
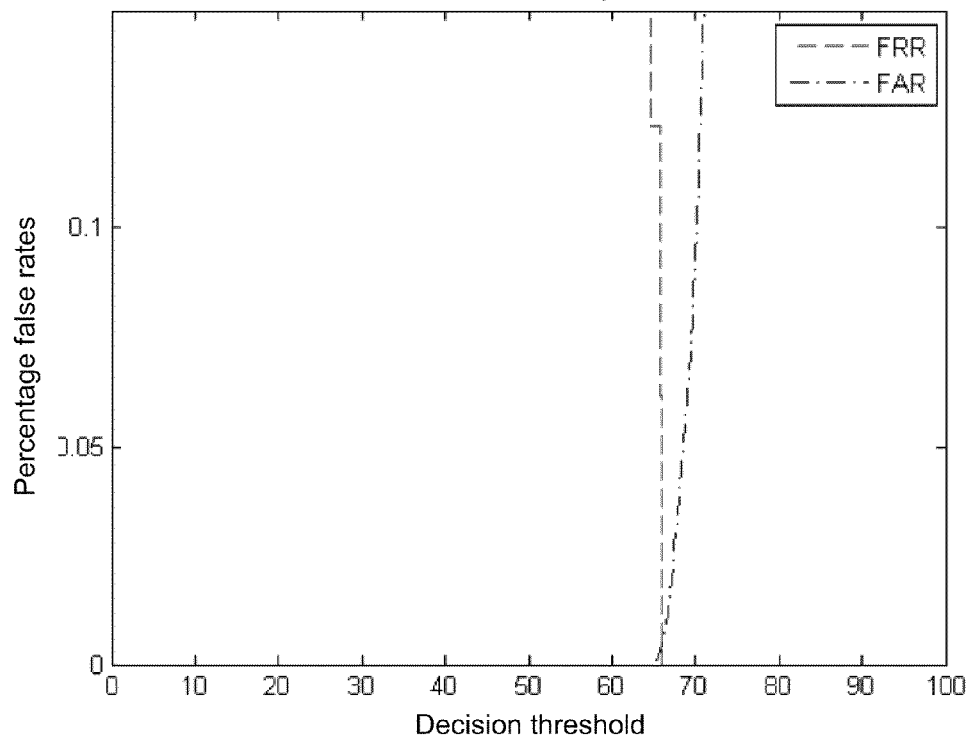
FIG. 10 is a chart illustrating FAR, FRR plots for (2D and 3D) features.
Figure 11:
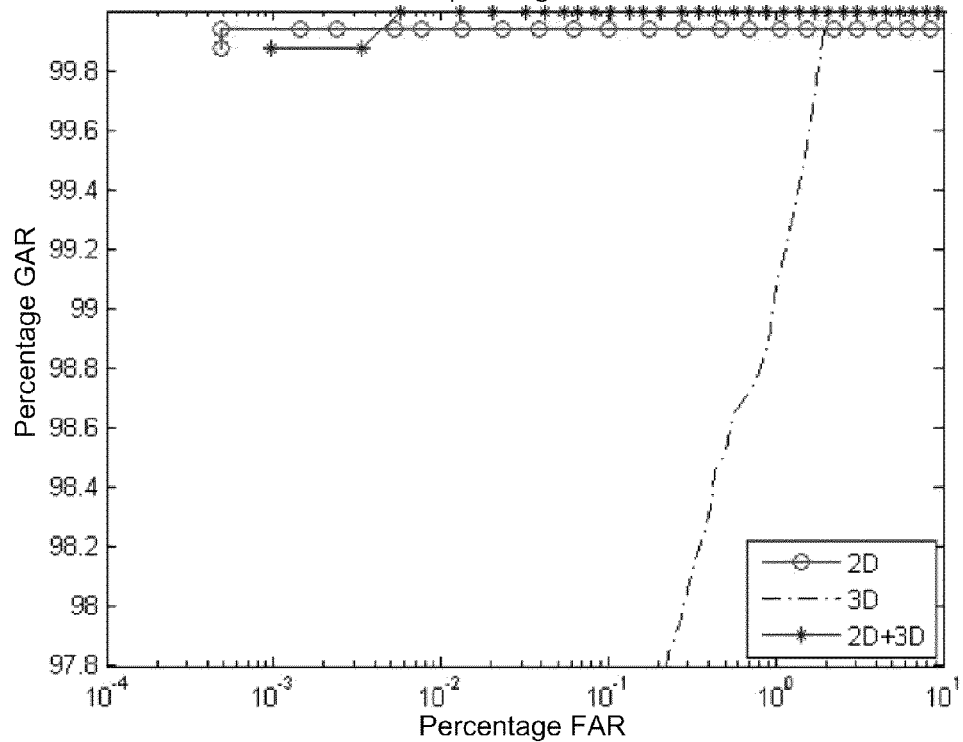
FIG. 11 is a chart illustrating Receiving Operating Characteristics (ROC) curves for 2D, 3D and the multilevel (2D and 3D) features.

Table 1 indicates that the multilevel approach for combination of 2D and 3D features achieves the best performance because the Equal Error Rate (EER) is 0.0022% and the decidability index is 7.45. This performance is significantly higher compared to the case where either 2D or 3D palmprint features solely are used. FIG. 10 shows the FAR and FRR plots for both 2D and 3D features used together. FIG. 11 illustrates the comparative Receiver Operating Characteristics (ROC) obtained when comparing using 2D features solely, 3D features solely and 2D and 3D features together.

To evaluate the robustness of the system against sensor level spoof attacks, a set of experiments was performed. The vulnerability of 2D palmprint image based authentication system against such attacks was also analysed. The experiments involved collecting data from five subjects in two stages. In the first stage, subjects are asked to present their real hand. In the second stage, images of the same users' fake hand (palm side) are presented to the image acquisition device. The fake palmprints generated from the genuine users' palmprint images were used in the evaluation. The real hand with a fake palmprint was presented to the system. Experiments were performed in a verification scenario, that is, a user's palmprint image captured in the first stage is matched to the one captured in the second stage. A match is counted as correct if the resulting matching score is less than the decision threshold. The decision threshold is the operating point of EER which represents the commonly preferred operating point for most practical applications. The results from this set of experiments are summarized in Table 2.

TABLE 2

Matching scores from fake palmprints (spoof attack analysis)

| User ID | 2D Matching Score (Threshold = 82.69) | 3D Matching Score (Threshold = 58.19) | 2D + 3D Matching Score (Threshold = 66.01) |
|---|---|---|---|
| 1 | 63.75 | 72.42 | 67.56 |
| 2 | 66.69 | 75.68 | 70.65 |
| 3 | 67.09 | 81.89 | 73.60 |
| 4 | 59.46 | 74.59 | 66.10 |
| 5 | 60.26 | 76.79 | 67.5 |

The results in Table 2 show that the user verification using 2D palmprint features fails to discriminate between real and fake palmprint samples for all users. Matching scores for 2D palmprint features are significantly below the decision threshold at EER, which suggest that the system considers all matches as correct.

Table 2 indicates that for the 3D and (2D and 3D combination) features, the system counts all matches as incorrect or negative because the matching scores for 3D and 2D+3D are above their corresponding decision thresholds. 3D features performs better than the 2D+3D combination. Matching scores for 3D features are significantly above the decision threshold, while 2D+3D scores are closer to the decision threshold. This is one reason for the system to entirely rely on 3D features to reject fake palmprints at the first level of the multilevel authentication approach. The decision threshold for Decision Module I 41 was set to 61.03, and all the 3D match scores in Table 2 are above this decision threshold. This suggests that the system is successful in rejecting all fake palms at the first level of the multilevel authentication approach. The experimental results presented in Table 2 demonstrate the robustness of the system against the spoof attacks at the sensor level.

The experimental results presented in FIGS. 7 to 11 illustrate a performance gain of 96% in EER and 14.6% in the decidability index when the acquired 3D features are combined with traditional 2D palmprint features acquired at the same time. Experimental results on a real palmprint database 40 have demonstrated a significant performance improvement of using a combination 2D and 3D over 2D or 3D alone.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A biometric identification system for identifying a person, the system comprising:
   an image acquisition module to capture a three-dimensional (3D) image of a palm of the person;
   a region of interest (ROI) extraction module to extract a 3D subimage from the captured image; and
   a 3D features extraction module to extract 3D palmprint features from the 3D subimage;
   wherein the extracted 3D palmprint features are compared to reference 3D palmprint features to verify the identity of the person, and
   wherein the ROI extraction module extracts a two-dimensional (2D) subimage from the captured image, and further comprises:
   a 2D features extraction module to extract 2D palmprint features from the 2D subimage and to generate competitive code maps using the extracted 2D palmprint features, and
   wherein angular distances between the competitive code maps and reference competitive code maps are calculated in order to identify the person.

2. The system according to claim 1, wherein the 3D palmprint features include surface curvature of major palm lines.

3. The system according to claim 1, further comprising an infrared sensor to detect the presence of a palm to initiate image capture of the palm of the person.

4. The system according to claim 1, further comprising a Liquid Crystal Display (LCD) projector to generate arbitrary stripe patterns onto the surface of the palm to enable acquisition of depth information using active triangulation.

5. The system according to claim 1, wherein the image acquisition module is a charge coupled device (CCD) camera.

6. The system according to claim 1, wherein a matching score is calculated based on the comparison and the matching score is compared to a decision threshold, and if the matching score is greater than the decision threshold of a first decision module, the person is rejected as a fake palm or an impostor, and the identification process is terminated prior to a 2D Gabor feature extraction module extracting 2D palmprint features from the 2D subimage.

7. The system according to claim 1, wherein the ROI is a coordinate system which uses the gaps between the fingers as reference points, and the 3D subimage is a fixed size located at a central part of the palm.

8. The system according to claim 1, wherein the 3D features extraction module generates a curvature map using the extracted 3D palmprint features, and the curvature map is compared to a reference curvature map to determine whether a high correlation exists between the curvature maps in order to verify the identity of the person.

9. A biometric identification system for identifying a person, the system comprising:

an image acquisition module to capture a three-dimensional (3D) image of a palm of the person;

a region of interest (ROI) extraction module to extract a 3D subimage from the captured image; and a 3D features extraction module to extract 3D palmprint features from the 3D subimage;

wherein the extracted 3D palmprint features are compared to reference 3D palmprint features to verify the identity of the person, wherein the 3D features extraction module generates a curvature map using the extracted 3D palmprint features, and the curvature map is compared to a reference curvature map to determine whether a high correlation exists between the curvature maps in order to verify the identity of the person, and wherein the 3D features extraction module uses a normalized local correlation method is used to compare the curvature map to the reference curvature map, using the expression:

$$C = \frac{\sum_{i=-N}^{N} \sum_{j=-N}^{N} (P_{ij} - \overline{P})(Q_{ij} - \overline{Q})}{\sqrt{\left[\sum_{i=-N}^{N} \sum_{j=-N}^{N} (P_{ij} - \overline{P})^2\right]\left[\sum_{i=-N}^{N} \sum_{j=-N}^{N} (Q_{ij} - \overline{Q})^2\right]}}$$

where $P_{ij}$ and $Q_{ij}$ are curvature values in the neighborhood of the points being matched in the curvature map and reference curvature map, respectively, and $\overline{P}$ and $\overline{Q}$ are the mean curvature values in those neighborhoods.

* * * * *